Dec. 15, 1925.　　　　　　　　　　　　　　　　　　1,565,590
　　　　　　　　　　　M. J. RITTERRATH
　　　　　METHOD OF AND APPARATUS FOR PROJECTING COOL LIGHT
　　　　　　　　　Original Filed Oct. 11, 1920　　2 Sheets-Sheet 1
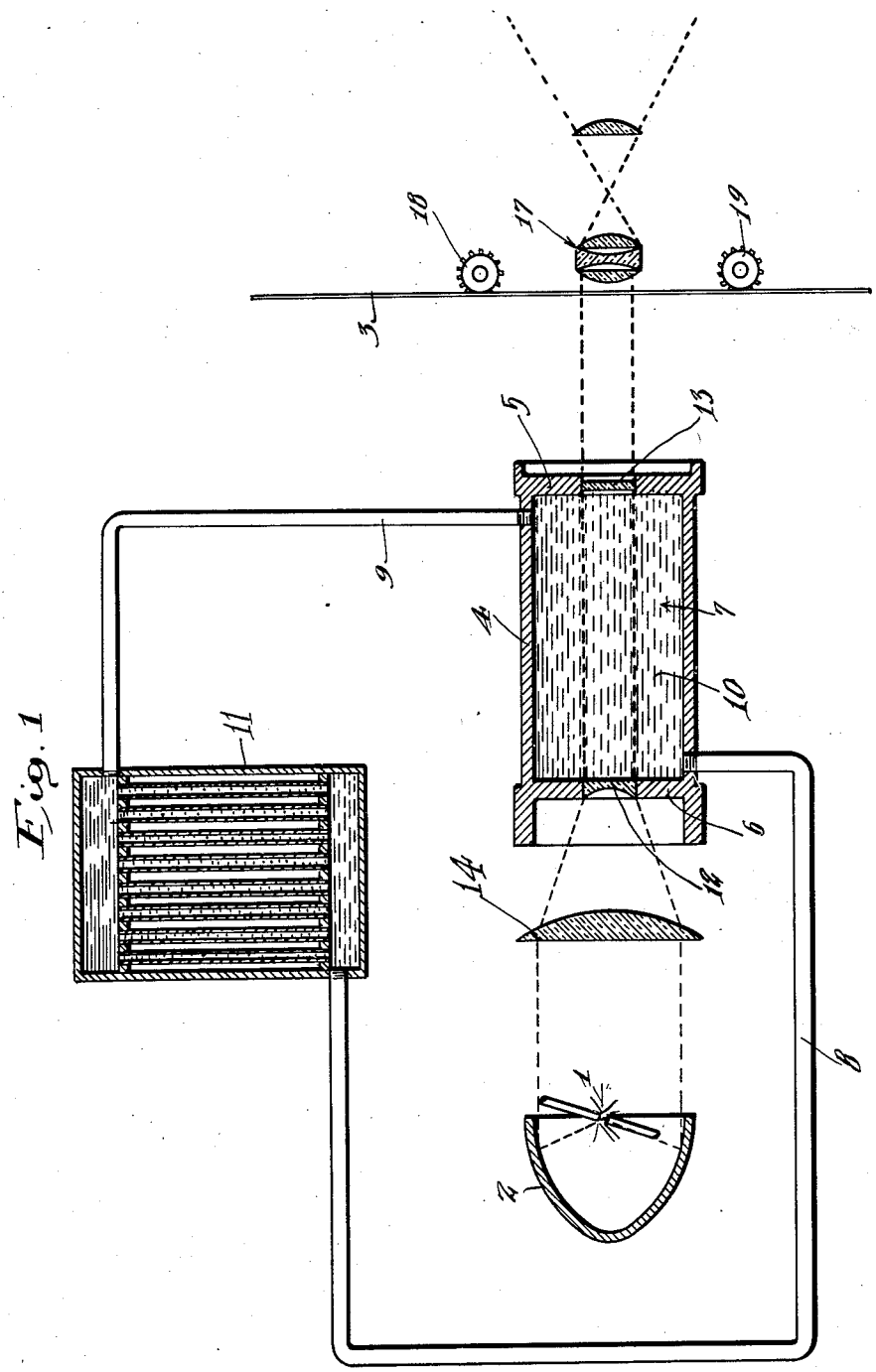
INVENTOR.
Max J. Ritterrath
BY
　　　　ATTORNEY Dec. 15, 1925.  
M. J. RITTERRATH  
1,565,590  
METHOD OF AND APPARATUS FOR PROJECTING COOL LIGHT  
Original Filed Oct. 11, 1920   2 Sheets-Sheet 2
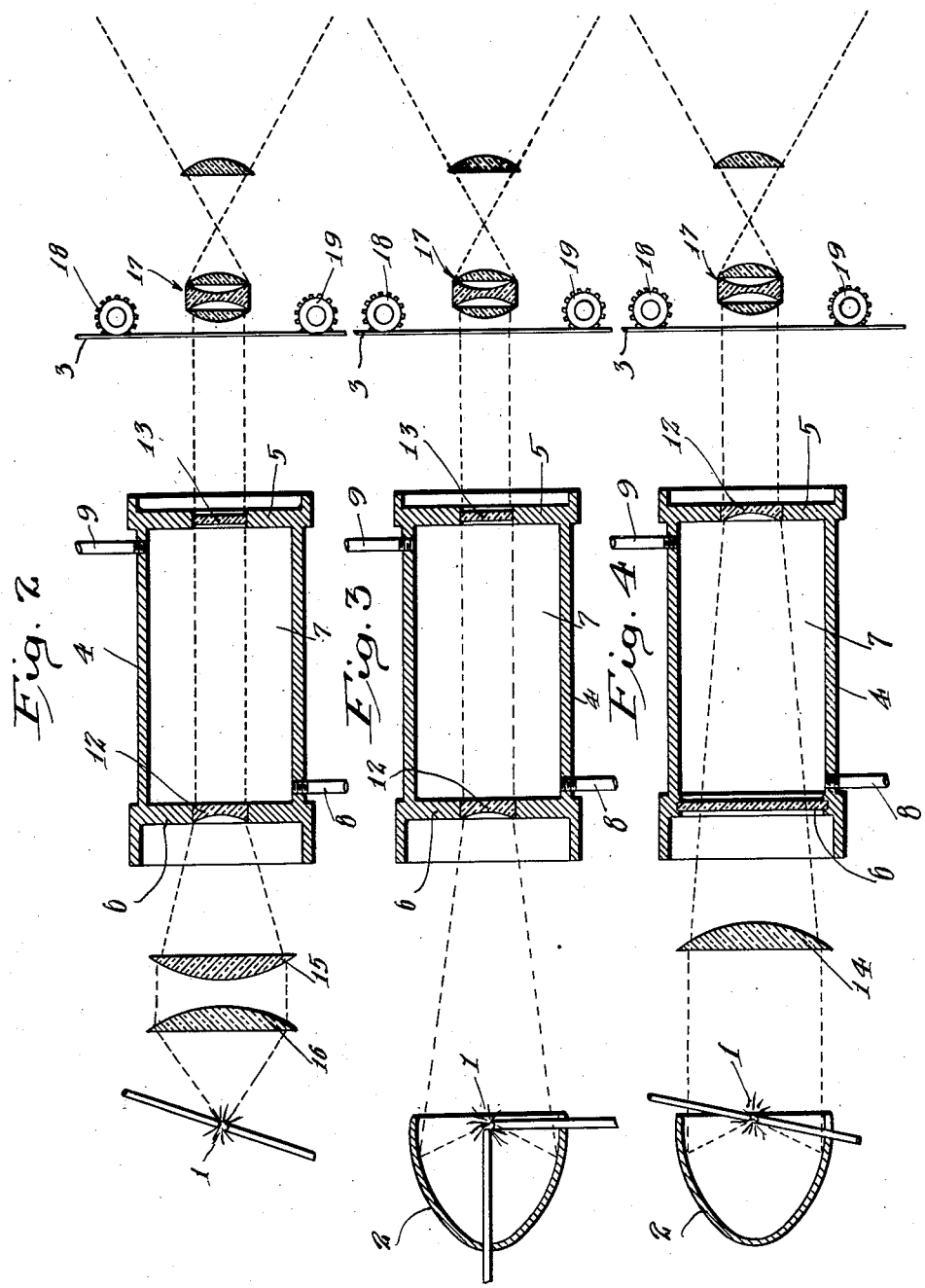
INVENTOR.  
Max J. Ritterrath  
BY  
ATTORNEY Patented Dec. 15, 1925.

1,565,590

UNITED STATES PATENT OFFICE.

MAX J. RITTERRATH, OF HOLLYWOOD, CALIFORNIA.

METHOD OF AND APPARATUS FOR PROJECTING COOL LIGHT.

Application filed October 11, 1920, Serial No. 416,026. Renewed November 15, 1923.

*To all whom it may concern:*

Be it known that I, MAX J. RITTERRATH, a citizen of the United States, residing at Hollywood, in the county of Los Angeles, State of California, have invented a new and useful Method of and Apparatus for Projecting Cool Light, of which the following is a specification.

This invention relates to a method of and apparatus for projecting cool light. Such cool light is useful as an illuminant for observing or photographing living organisms under the microscope and for projecting the images recorded on motion picture films on to the exhibiting screen and an object, in general, of the invention is to produce uniformity of illumination of all portions of the projected images.

Another very important object is to eliminate the, so-called, ghost effect in the projected images.

Another object is to cause converging of the radiations and projection thereof in parallel paths through the film without first bringing the radiations to a focus between the radiant and the film.

Another object is to effect cooling of the light rays between the radiant source and the film, so that if the film should accidentally be allowed to be stationary for a longer period of time than is ordinarily required in projecting the same, the film will not be shriveled or take fire and be destroyed and thus endanger life and property.

In my copending application, filed June 9, 1920, Serial No. 387,557, I have disclosed the bringing of the radiations from the radiant source to a focus within a fluid body or a partial vacuum, and then diverging of the radiations and projecting them in parallel paths through the film.

In contradistinction to the method and apparatus disclosed in said copending application, an object of this invention is to effect greater cooling of the radiations by passing them through the partial vacuum or cooling fluid without bringing said radiations to a focus and projecting the radiations in paths extending from the radiant source to the film without bringing the radiations to a focus at any point along said paths. I have discovered that if the radiations be projected through the cooling medium in converging paths through the agency of a positive lens the focal point of the radiations whether within the cooling medium or outside thereof will be substantially as hot as though the cooling medium were not interposed between the radiant and the focal point of the radiations. I therefore pass the radiations unfocused through the cooling chamber and then project them in parallel paths through the film.

The accompanying drawings illustrate the invention:

Figure 1 is a more or less diagrammatic view of an apparatus made in accordance with the provisions of this invention, and by the use of which the new method is performed. The apparatus is mainly shown in vertical mid-section.

Fig. 2 is a sectional elevation of a modified form of the apparatus.

Fig. 3 is a sectional elevation of another modified form of the apparatus.

Fig. 4 is a sectional elevation of a still further modified form of the apparatus.

The radiant or source of light and heat-producing effects is indicated at 1, and in Figs. 1, 3 and 4 I have shown a parabolic mirror 2, which functions to converge and project the radiations toward the film, which is indicated at 3. Between the film 3 and radiant 1 is a tubular casing 4 having end walls 5, 6 and forming interiorly thereof a chamber 7. Communicating with the chamber 7 are pipes 8, 9 adapted to supply fluid to the chamber 7 or exhaust the air therefrom so as to produce a partial vacuum. In Fig. 1 a fluid body is indicated at 10 and the pipes 8, 9 are connected with a suitable cooling device in the form of a radiator 11 through which the fluid may circulate to cause cooling of the fluid.

The tubular member 4 is provided at one end with a plano concave lens 12, which in Figs. 1, 2 and 3 is positioned in the end wall 6. In Fig. 4 the lens 12 is positioned in the end wall 5 and the wall 6 is formed by a flat transparent member or window. In Figs. 1, 2 and 3 the wall 5 is provided with a transparent member or window 13. The transparent members 6, 13 are of flat form and therefore have no converging or diverging effect on the radiations, but simply transmit said radiations in the direction in which they are traveling when they impinge upon the transparent members.

In Figs. 1 and 4 a parabolic lens 14 is interposed between the lens 12 and radiant 1, said lens 14 being preferably corrected for spherical and chromatic aberrations. The lens 12 is also preferably corrected for spherical and chromatic aberrations.

In Fig. 3 there is no plano convex lens interposed between the lens 12 and the radiant 1, the radiations being projected by the mirror 2 directly through the lens 12.

In Fig. 2 two plano convex lenses 15, 16 are interposed between the lens 12 and radiant 1, the convex surfaces of said lenses being turned toward one another.

In the various views the film 3 is interposed between the radiant 1 and an objective 17, which may consist of any suitable number and type of lens for magnifying the images and projecting said images upon the exhibiting screen, not shown. The objective 17 may be of the usual or any preferred construction.

In practice, with the type of apparatus shown in Fig. 1, the radiations will be projected by the mirror 2 in parallel paths to the lens 14 which converges the radiations upon the plano concave lens 12. The radiations then pass in approximately parallel paths from the lens 12 through the flat transparent member 13 and through the film 3 to the objective 17 and thence to the exhibiting screen, not shown. The radiations in passing into the fluid body 10 are intercepted by said body and absorbed thereby so that they do not strike the film 3.

In the apparatus shown in Fig. 2, the radiations pass through the lenses 15, 16 and are converged upon the plano convex lens 12. The radiations are then projected in the same manner as above described for the apparatus shown in Fig. 1.

In the form of apparatus shown in Fig. 3 the radiations are projected by the mirror 2 directly upon the plano concave lens 12, and the radiations are then projected further in the same manner as above described for the apparatus shown in Fig. 1.

In the form of apparatus shown in Fig. 4 the radiations are projected through the lens 14 in the same manner as described above in connection with the apparatus shown in Fig. 1. The cool lens 14 then converges the radiations and projects them to the plano concave lens 12 through the flat transparent member 6, the infra red rays being either absorbed by the fluid 10 or end wall 5. The plano concave lens 12 then projects the cool radiations in parallel paths through the film to the objective 17 which, in turn, projects the images in magnified form upon the exhibiting screen.

From the foregoing, it is especially to be noted that the radiations are not converged to a local point within the chamber 7 nor, indeed, are they brought to a focus at any point between the radiant 1 and the film 3; that in Figs. 1, 2, 3 the cool radiations are projected by the plano concave lens 12 in approximately parallel paths through the chamber 7 and through the film; and that in Fig. 4 the radiations are projected in slightly converging paths through the chamber 7 and are then received by the plano concave lens 12 and projected thereby in parallel paths through the film. It may be further noted that one of the principle features of the invention is the interposing of a lens having a plane surface between the radiant and the film, with its plane surface facing the film so as to project the cool radiations received by said lens in approximately parallel paths through the film. Though the lens 12 is disclosed as having a concave surface facing the radiant, it will be readily understood that different systems of lenses may be placed between the lens 12 and radiant and that some systems would necessitate the lens 12 being convex on the face turned toward the radiant. It will be readily understood that other optical elements than the lens 12 may be employed for the practice of my invention, without departing from the spirit thereof. It is especially to be noted that because of the construction and arrangement of the parts shown in Fig. 3 the number of lenses interposed between the radiant and the film is reduced to a minimum, and an advantage of this is that maximum strength of the radiations is secured at the film 3, since there are no lenses interposed between the lens 12 and radiant to absorb the radiations. A lens absorbs substantially ten percent of the radiations received by it. By this construction therefore, it will be readily comprehended that I am enabled to reduce the amperage of the radiant 1 to a minimum and still obtain effective illumination of the images projected upon the exhibiting screen.

It is to be understood that the chamber 7 in Figs. 2, 3 and 4 may be supplied with a fluid body, or that the air may be exhausted therefrom by any well known means so as to produce a partial vacuum in said chamber. It is also to be understood that, though I have indicated a fluid body in Fig. 1, such fluid body may be drawn off and the air partially exhausted to produce a partial vacuum, in which event the pipes 8 and 9 may be connected with any well known form of exhaust pump for exhausting the air from the chamber 7.

The film 3 engages upper and lower sprockets 18, 19 and is driven in the usual manner to produce intermittent motion of the film as is well understood in the art pertaining to the projection of motion pictures.

I claim:

1. The method of projection consisting in converging the radiations from a source thereof, then diverging said radiations before they come to a focus, passing the radiations thus projected through a constantly changed cooling liquid to abstract heat produced by the infra-red radiations, and then passing the radiations without convergence through the object to be projected.

2. In a projection apparatus, a radiant, means to hold the object to be projected, a liquid cooling cell between the object-holding means and the radiant having a ray-diverging lens at the end turned toward the radiant and having a transparent member at its opposite end, means to converge the rays from the radiant upon the ray-diverging lens before said rays come to a focus, the ray-converging means and ray-diverging lens cooperating to project the rays through the cooling cell, without convergence of the rays, and an objective to receive the rays projected through the object.

Signed at Los Angeles, California this 3d day of September, 1920.

MAX J. RITTERRATH.